United States Patent
Hirooka et al.

(10) Patent No.: US 8,522,639 B2
(45) Date of Patent: Sep. 3, 2013

(54) STEERING APPARATUS

(75) Inventors: Kouji Hirooka, Gunma-ken (JP); Suguru Sugishita, Gunma-ken (JP)

(73) Assignee: Yamada Manufacturing Co., Ltd., Kiryu-shi, Gunma-ken (JP)

( * ) Notice: Subject to any disclaimer, the term of this patent is extended or adjusted under 35 U.S.C. 154(b) by 612 days.

(21) Appl. No.: 12/659,451

(22) Filed: Mar. 9, 2010

(65) Prior Publication Data

US 2010/0242662 A1 Sep. 30, 2010

(30) Foreign Application Priority Data

Mar. 27, 2009 (JP) ................................ 2009-080678

(51) Int. Cl.
*B62D 1/18* (2006.01)

(52) U.S. Cl.
USPC ............................. 74/493; 280/775; 74/492

(58) Field of Classification Search
USPC .... 267/151–153; 74/492–495; 280/775–777
See application file for complete search history.

(56) References Cited

U.S. PATENT DOCUMENTS

| | | | | |
|---|---|---|---|---|
| 2,596,780 | A | * | 5/1952 | Meyers et al. ................ 267/140 |
| 8,051,742 | B2 | * | 11/2011 | Osawa et al. .................... 74/493 |
| 2005/0225068 | A1 | * | 10/2005 | Ishida et al. ................... 280/775 |
| 2006/0151984 | A1 | * | 7/2006 | Higashino et al. ............. 280/775 |
| 2006/0230864 | A1 | * | 10/2006 | Shinohara et al. .............. 74/492 |
| 2009/0241721 | A1 | * | 10/2009 | Inoue et al. ..................... 74/493 |

FOREIGN PATENT DOCUMENTS

| | | |
|---|---|---|
| JP | 60-038262 A | 2/1985 |
| JP | 60-73665 | 5/1985 |
| JP | 1-147780 | 10/1989 |
| JP | 2000-344112 | 12/2000 |
| JP | 2002-145078 A | 5/2002 |
| JP | 3754075 | 12/2005 |
| JP | 2006-281842 A | 10/2006 |
| JP | 2009107506 A * | 5/2009 |

OTHER PUBLICATIONS

Japanese Office Action dated Feb. 26, 2013 with English Translation Thereof.
English Translation of Original Specification for Japanese Patent Application Publication No. 2006-281842 A.

* cited by examiner

*Primary Examiner* — David M Fenstermacher
*Assistant Examiner* — Emily Cheng
(74) *Attorney, Agent, or Firm* — McGinn IP Law Group, PLLC

(57) ABSTRACT

The present invention provides a steering apparatus that can provide good operation feeling in telescopic adjustment and can have a very simple configuration. The steering apparatus has a fixed bracket, a movable bracket, a sliding shaft support member, and a tightening tool. The sliding shaft support member is constituted by a main sliding unit made of an inelastic resin and buffer portions made of a rubber or an elastic resin. The buffer portions are fixedly attached to both sides of the main sliding unit in the front-rear direction, the upper and lower surfaces of the main sliding unit are in a state of sliding contact with both guide edges of a long hole for telescopic adjustment of the movable bracket, and the buffer portions can abut only on both stop end edges and do not come into contact with the two guide edges.

5 Claims, 8 Drawing Sheets

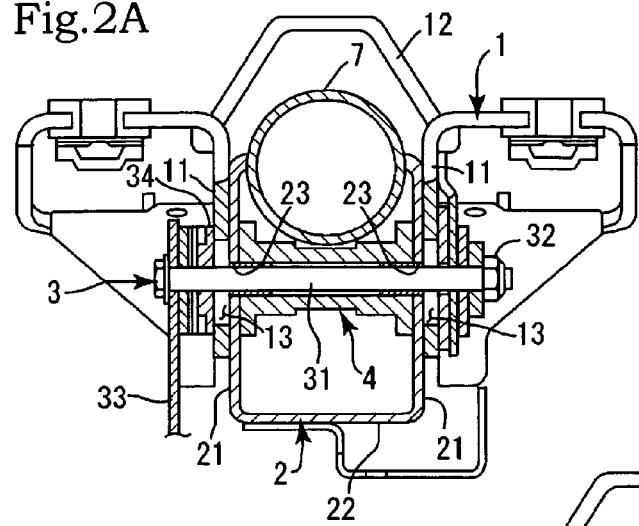
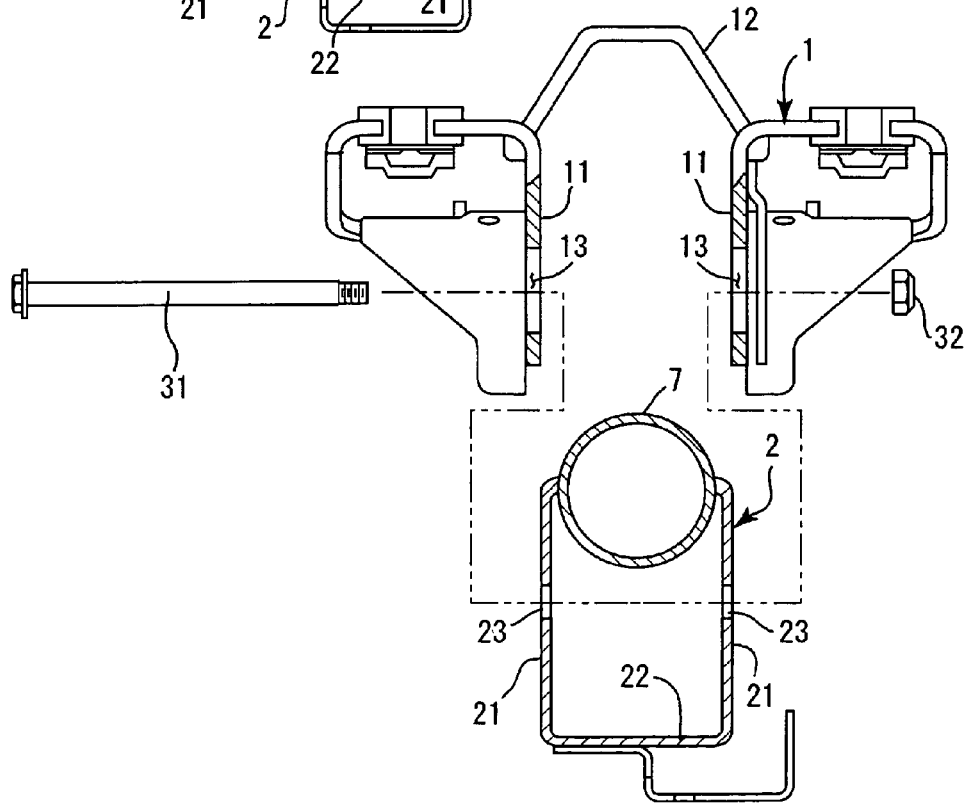

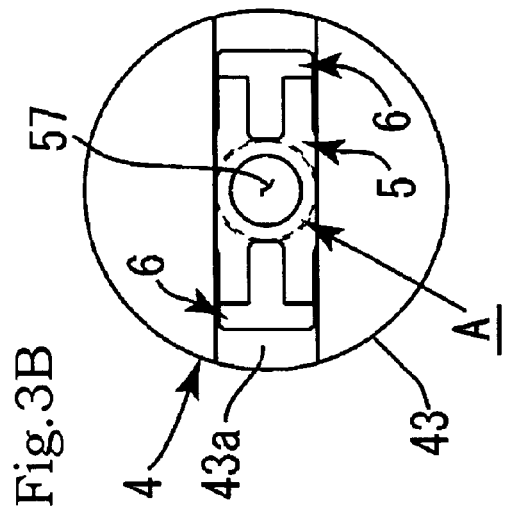
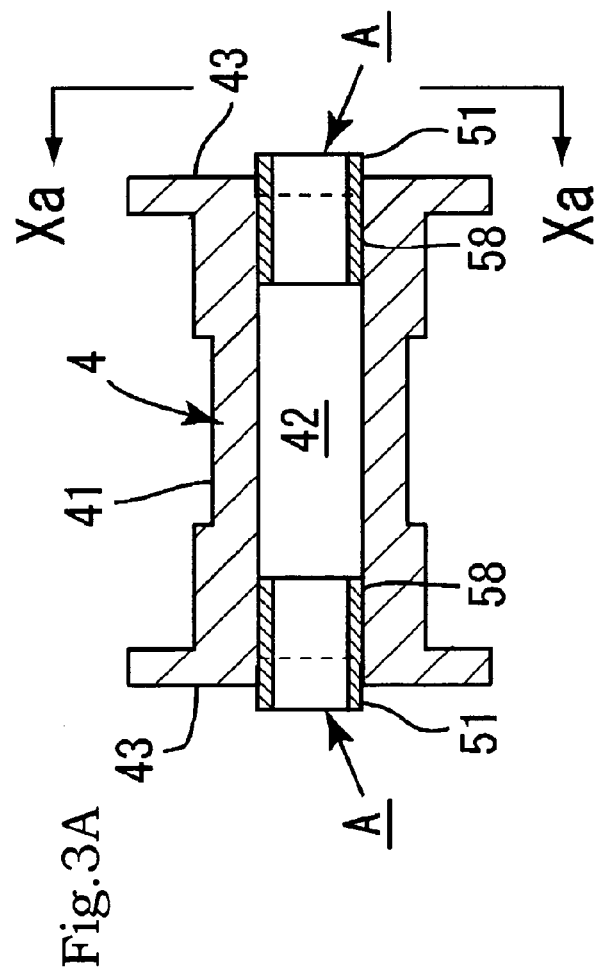

Ha > Hb

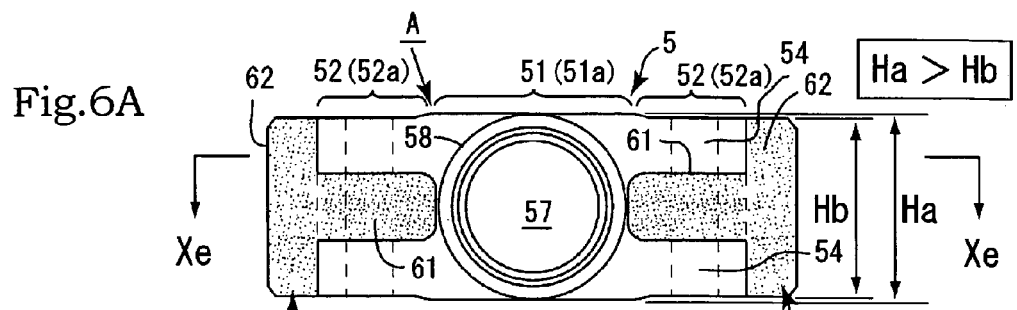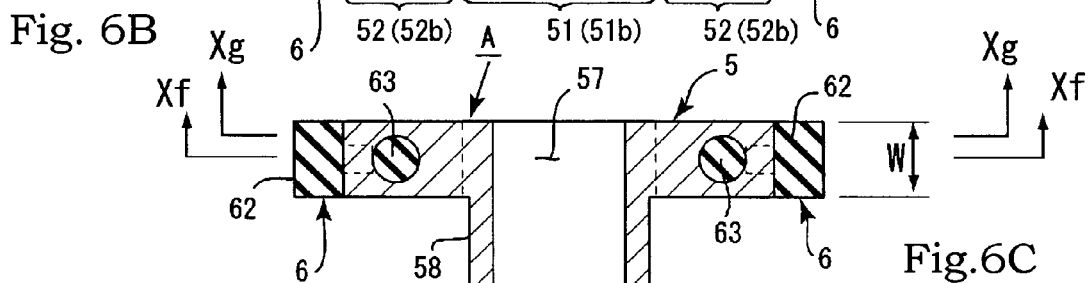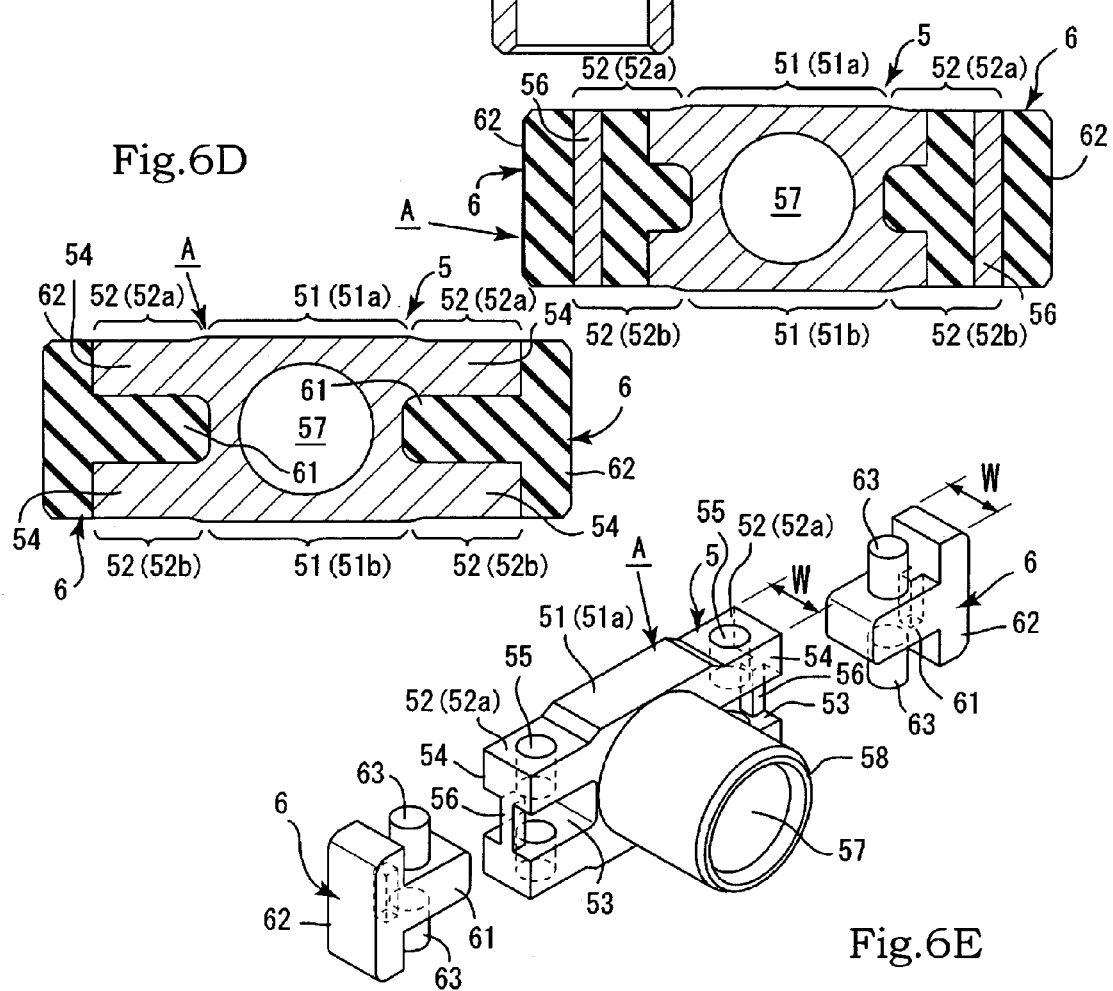

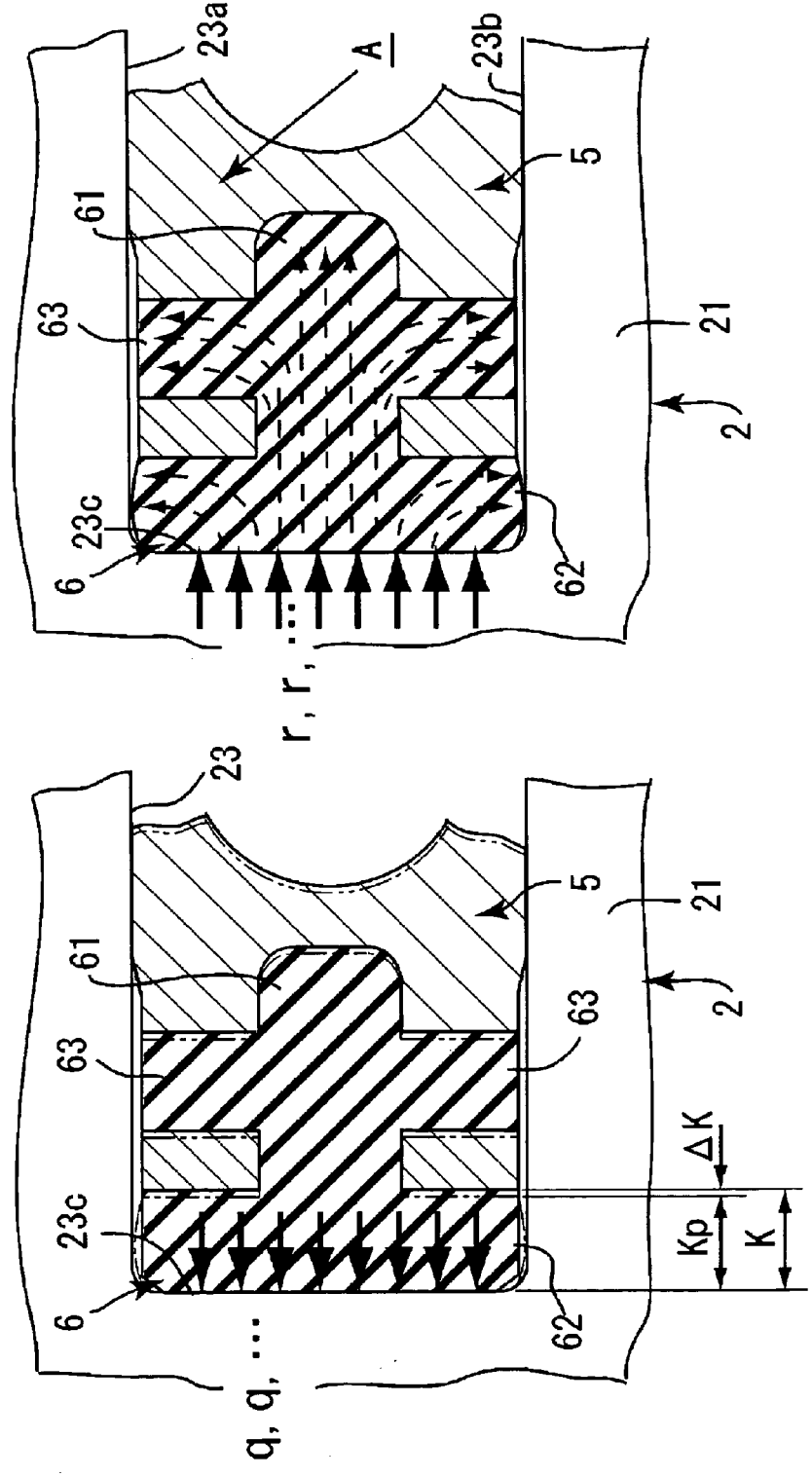

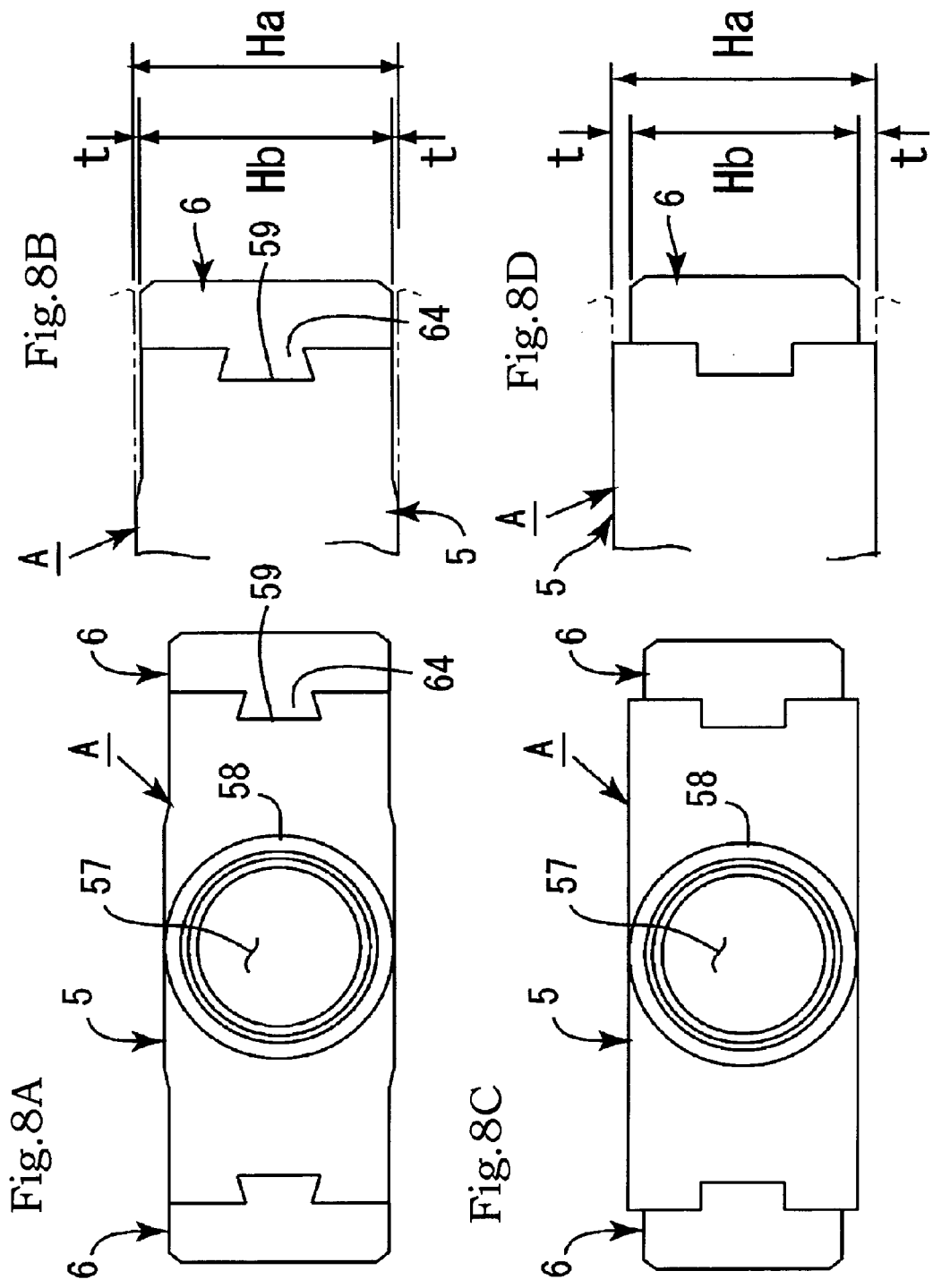

STEERING APPARATUS

BACKGROUND OF THE INVENTION

1. Field of the Invention

The present invention relates to a steering apparatus that can provide good operation feeling in telescopic adjustment and can have a very simple configuration.

2. Description of the Related Art

There are steering apparatuses provided with a telescopic adjustment mechanism. A typical structure of the steering apparatus of this kind is constituted by a fixed bracket mounted on a vehicle and a movable bracket provided with the steering column, and the movable bracket is mounted on the fixed bracket so that the movable bracket can move in the front-rear direction and can be fixed. The fixed bracket is typically configured to clamp the movable bracket. The sliding movement of the movable bracket in the front-rear direction is realized by a long hole for telescopic operation that is present in either of the movable bracket and fixed bracket, a bolt inserted into the long hole for telescopic operation, a tightening member such as a nut, a slide member that inserts the bolt into the long hole, and a guide member that causes smooth sliding of the slide member. In this configuration, the slide member and guide member play a role of eliminating a handle play when the bolt of a tightening shaft is guided along the shape of the long hole for telescopic operation.

In particular, it is important to improve the operation feeling in tilt telescopic adjustment and many efforts have been made to inhibit the handle play during operation. Examples of conventional techniques of this type in which a sliding portion of a telescopic column is provided with resin slide member and guide member are disclosed in Japanese Patent No. 3754075 and Japanese Patent Application Laid-Open No. 2000-344112.

Japanese Patent No. 3754075 describes a structure constituted by a long orifice for tilting into which a tightening bolt for tilting and telescopic operation is inserted, a rubber sleeve 11 for fitting the bolt into other long orifices, a resin liner 1 that causes the rubber sleeve 11 to slide, and an insert 10 that imparts elasticity to both end portions of the long orifice of the liner 1. Further, Japanese Patent Application Laid-Open No. 2000-344112 describes a structure provided with a slide frame 10 that causes a slide piece 9 protruding from a steering column to slide with respect to a tilt swinging member 7 that is swingably and pivotally supported by a bracket fixed to the vehicle, wherein the slide piece 9 serves as a resin slider 17 and resin guides 16a, 16b are provided at the slide frame 10.

SUMMARY OF THE INVENTION

In the configuration described in Japanese Patent No. 3754075, a locking member 30 is formed as a solid rubber molded on a metal mold or a rubber molding portion having a rubber, so as to provide a buffer portion 31. In the locking member 30 that is inserted into the friction-reducing elements IV' and IL' having a frame-like shape, the contact zone is from a rubber. Therefore, an intimate contact state is assumed in elastic contact and sliding ability can be lost. In the configuration described in Japanese Patent Application Laid-Open No. 2000-344112, the sliding is facilitated with respect to that in the configuration described in Japanese Patent No. 3754075 because the resin slider 17 is caused to slide against the resin guides 16a, 16b of the resin frame. However, impacts during contact at the front and rear ends in the sliding direction are difficult to absorb. It is an object of the present invention to improve the smoothness of sliding of a steering column in the telescopic direction, inhibit impacts during the movement of the steering column to the front end and rear end, and improve the operation feeling during steering.

The inventors have conducted a comprehensive study aimed at the resolution of the above-described problems. The results obtained demonstrated that exemplary embodiments of the invention resolve the above-described problems by providing a steering apparatus including a fixed bracket, a movable bracket having a movable side portion in which long holes for telescopic adjustment are formed at both sides in the width direction, a sliding shaft support member that has a shaft support hole formed therein and can slide inside the long holes for telescopic adjustment, and a tightening tool that links the fixed bracket and the movable bracket and is supported by the sliding shaft support member, wherein the long holes for telescopic adjustment have both end edges in the up-down direction as guide edges and have both ends in the front-rear direction as stop end edges, the sliding shaft support member is constituted by a main sliding unit made of an inelastic resin and buffer portions made of a rubber or an elastic resin, the buffer portions are fixedly attached to both sides of the main sliding unit in the front-rear direction, upper and lower surfaces of the main sliding unit are in a state of sliding contact with the two guide edges of the long hole for telescopic adjustment, and the buffer portions can abut only on the two stop end edges and do not come into contact with the two guide edges.

Additional exemplary embodiments have the upper and lower side surfaces in a substantially central portion in the front-rear direction of the main sliding unit of the sliding shaft support member are contact region portions having sliding surfaces that are in contact with upper and lower guide edges of the long hole for telescopic adjustment, and two sides in the front-rear direction of the main sliding unit are contactless region portions that are not in contact with the two guide edges. The invention as in claims 3 and 4 resolves the above-described problems by providing a steering apparatus according to claim 1 or 2, wherein a recess of a substantially bifurcated shape is formed along the up-down direction and at both sides in the front-rear direction of the main sliding unit of the sliding shaft support portion, a through hole that passes through in the up-down direction is formed in the main sliding unit in a position corresponding to a zone where the recess is formed, a shaft-like portion is integrally formed in the up-down direction of the recess, and part of the buffer portions is inserted into the recess and fixedly attached thereto.

According to an exemplary embodiment of the invention, the end edges in the up-down direction of the long hole for telescopic adjustment are taken as guided edges, and only the upper and lower sliding surfaces of the sliding main body portion, which is made from an inelastic resin, of the sliding shaft support member are in contact with the upper and lower guide edges, whereas the buffer portions made from an elastic resin are not in contact with the guide edges. As a result, good sliding ability of the sliding shaft support member can be obtained. In addition, because the buffer portions made from an elastic resin are fixedly attached in the front-rear direction of the long hole for telescopic adjustment, a structure is obtained such that when the sliding shaft support member moves reciprocatingly in the front-rear direction of the long hole for telescopic adjustment, the buffer portions abut against the stop end edges, the impact occurring at the instant the buffer portions and stop end edges abut against each other is inhibited, the impact noise is minimized, and extremely good operation feeling during telescopic adjustment can be obtained.

According to another exemplary embodiment of the invention, the upper and lower side surfaces in a substantially central portion in the front-rear direction of the main sliding unit of the sliding shaft support member are contact region portions that serve as sites that are in contact with the upper and lower guide edges of the long hole for telescopic adjustment.

Further, the two sides in the front-rear direction of the main sliding unit are contactless region portions. With such a configuration, by taking the contactless region portions of the main sliding unit as reference planes for dimensions in the up-down direction in resin formation when the buffer portions are formed and fixedly attached, it is possible to form easily the buffer portions that are not in contact with the two guide edges of the long hole for telescopic adjustment by merely conducting resin molding so that the two end surfaces of the buffer portions in the up-down direction are flush. Further, the structure of the sliding shaft support member can be simplified. In addition, since contactless region portions are formed in the sliding main body portion, there are portions that are not in contact with the upper and lower guide edges of the long hole for telescopic adjustment, the contact surface area is reduced, and therefore sliding ability is improved.

Furthermore, in additional exemplary embodiments of the invention, a recess of a substantially bifurcated shape is formed in the sliding shaft support portion, a through hole that passes through in the up-down direction is formed in the bifurcated section of the main sliding unit in a position corresponding to a zone where the recess is formed, and a shaft-like portion is integrally formed in the up-down direction of the recess. Further, part of the buffer portion is inserted into the recess and fixedly attached thereto, whereby the volume ratio of buffer portions in the sliding shaft support member increases and impact absorption ability increases.

In addition, necessary sliding ability is maintained by merely forming a recess for inserting part of the buffer portion. Because a through hole is formed in the main sliding unit and the shaft-like portion is formed in the recess, where the buffer portion is formed by casting with respect to the recess of the sliding main body portion, a protruding portion is formed along the through hole of the main sliding unit in the buffer portion.

The protruding portion and the shaft-like portion formed at the main sliding unit side produce a synergetic effect and the buffer portion can play a role of a pull-out stop from the sliding main body portion, impacts can be reliably absorbed and a durable sliding shaft support member can be obtained. Sliding of the steering column in the telescopic direction is thus made smoother, impacts during movement towards the front end and rear end side of the steering column can be inhibited, and the operation feeling of steering can be improved.

BRIEF DESCRIPTION OF THE DRAWINGS

FIG. 2A is a front view with a partial section of the steering apparatus in accordance with the present invention, and FIG. 2B is a front view with a partial section illustrating a state in which the fixed bracket and movable bracket are separated;

FIG. 3A is a vertical sectional side view illustrating a state in which the sliding shaft support member is mounted on the collar member, and FIG. 3B is a view along the Xa-Xa arrows in FIG. 3A;

FIG. 6A is a front view of the sliding shaft support member, FIG. 6B is a sectional view along the Xe-Xe arrows in FIG. 6A, FIG. 6C is a sectional view along the Xf-Xf arrows in FIG. 6B, FIG. 6D is a sectional view along the Xg-Xg arrows in FIG. 6B, and FIG. 6E is a perspective view illustrating a state in which the main sliding unit and buffer portions of the sliding shaft support member are separated;

FIG. 7A is an enlarged sectional view illustrating a state in the instance in which the buffer portions of the sliding shaft support member abut on the stop end edges of the long hole for telescopic adjustment, and FIG. 7B is an enlarged sectional view illustrating a state immediately after the buffer portions of the sliding shaft support member have abutted on the stop end edges of the long hole for telescopic adjustment; and FIG. 8A is a front view illustrating the second embodiment of the sliding shaft support member, FIG. 8B is a principal enlarged view of the configuration shown in FIG. 8A, FIG. 8C is a front view illustrating the third embodiment of the sliding shaft support member, and FIG. 8D is a principal enlarged view of the configuration shown in FIG. 8C.

DESCRIPTION OF THE PREFERRED EMBODIMENTS

Figure 1A:
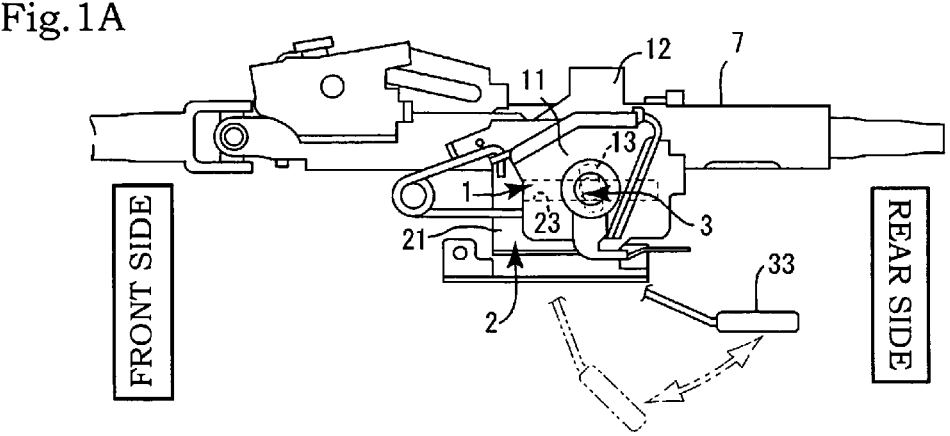
FIG. 1A is a side view of the steering apparatus in accordance with the present invention.

An embodiment of the present invention will be described below with reference to the drawings. As shown in FIG. 1A, FIG. 2, and FIG. 3, the principal configuration in accordance with the present invention is constituted by a fixed bracket 1, a movable bracket 2, a tightening tool 3, a collar member 4, and a sliding shaft support member A. The fixed bracket 1 is constituted by a pair (left and right) of fixed side portions 11, 11 and an attachment top portion 12. Adjustment holes 13, 13 are formed in a substantially vertical direction or longitudinal direction in the two fixed side portions 11, 11. The attachment top portion 12 is mounted on a predetermined region inside the vehicle, with a capsule member being interposed therebetween, and can absorb impact energy in case of collision.

In the movable bracket 2, as shown in FIG. 1A and FIG. 2, movable side portions 21, 21 are formed at both sides in the width direction. A bottom surface portion 22 that integrally links the two movable side portions 21, 21 is formed below the two movable side portions 21, 21. A steering column 7 is fixed by welding in a clamped state to the upper ends of the two movable side portions 21, 21. The two movable side portions 21, 21 are mounted in a clamped state between the two fixed side portions 11, 11 of the fixed bracket 1. Long holes 23, 23 for telescopic adjustment that serve for tilting and telescopic adjustment are formed in the two movable side portions 21, 21 of the movable bracket 2.

Figure 1B:
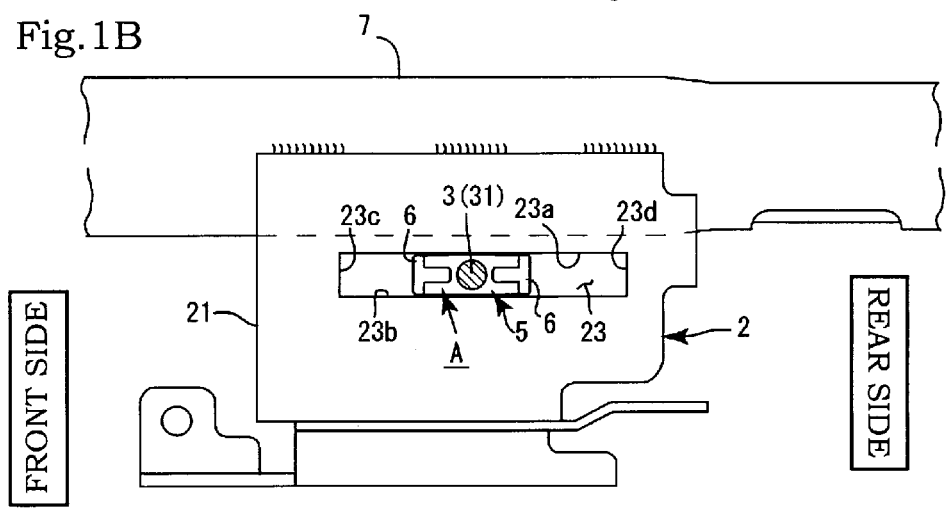
FIG. 1B is a principal side view of the movable bracket in a state in which the sliding shaft support member is mounted on a long hole for telescopic adjustment.
Figure 4A:
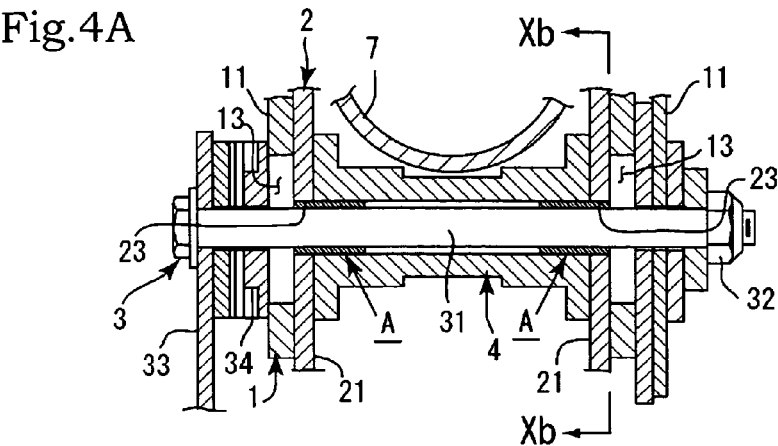
FIG. 4A is a vertical sectional enlarged front view of the principal portion of the steering apparatus in accordance with the present invention.
Figure 4B:
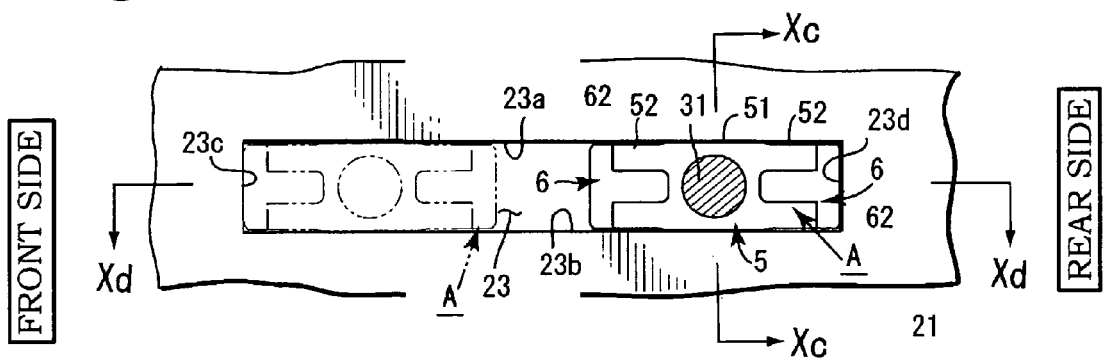
FIG. 4B is a principal sectional view along the Xb-Xb arrows in FIG. 4A.

As shown in FIG. 1B and FIG. 4B, the hole 23 for telescopic adjustment is a slit-like or linear through hole formed along the axial direction of the steering column 7 mounted on the movable bracket 2. In the hole 23 for telescopic adjustment, of the two end edges in the up-down direction, the upper one is called an upper guide end edge 23*a* and the lower one is called a lower guide end edge 23*b*. Of the two ends in the front-rear direction of the hole 23 for telescopic adjustment, the front one is called a front stop end edge 23*c* and the rear one is called a rear stop end edge 23*d*. The front-rear direction as referred to herein is a direction based on the front-rear direction of the automobile in a state in which the steering apparatus is mounted on the automobile. Thus, a front wheel side (not shown in the figure) of the steering apparatus is taken as a front side, a side of the steering apparatus where a handle (not shown in figure) is mounted is taken as a rear side, and a direction linking the front wheel side and the handle side is called the front-rear direction (see FIGS. 1A and 1B).

Further, adjustment holes 13, 13 for a tilting and telescopic adjustment mechanism are formed in the fixed side portions 11, 11 also in the fixed bracket 1 (see FIG. 1A and FIG. 2). The adjustment hole 13 is aligned with the long holes 23, 23 for telescopic adjustment of the movable bracket 2, and a bolt 31 of the tightening tool 3 is inserted thereinto through the below-described collar member 4 and sliding shaft support member A. A lock lever portion is mounted on the bolt 31 of the tightening bolt 3, and the fixed bracket 1 and movable bracket 2 during the operation of the tilting and telescoping adjustment mechanism are locked and unlocked by the rotational operation of the lock lever portion (see FIG. 1A).

Figures 1C, 1D:
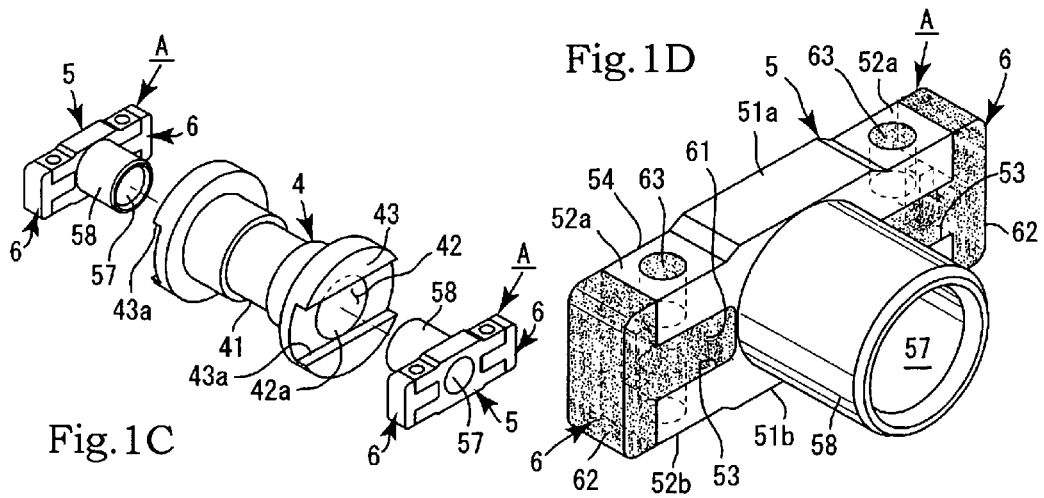
FIG. 1C is a perspective view illustrating a state in which the collar member and the sliding shaft support member are separated.
FIG. 1D is an enlarged perspective view of the sliding shaft support member.
Figure 5A:
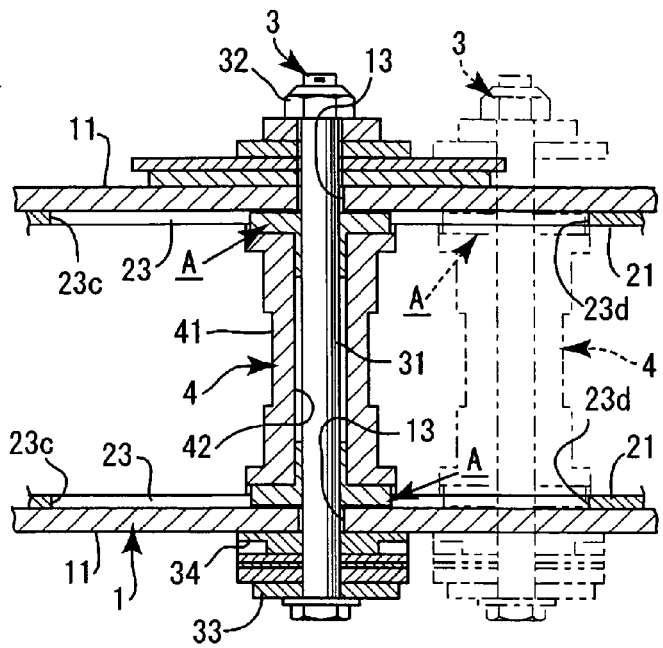
FIG. 5A is a principal sectional view along the Xd-Xd arrows in FIG. 4B.

Further, as shown in FIG. 1C and FIG. 4A, the collar member 4 has a substantially cylindrical shape, and an axial through hole 42 is formed along the axial direction of a cylindrical main body portion 41. As shown in FIG. 4A and FIG. 5A, the collar member 4 is disposed in the location of the longs holes 23, 23 for telescopic adjustment between the two movable side portions 21, 21 of the movable bracket 2, the bolt 31 of the below-described tightening tool 3 is inserted in a free insertion state into the long holes 23, 23 for telescopic adjustment and the axial through hole 42, and the fixed bracket 1 and movable bracket 2 are linked together.

The cylindrical main body portion 41 has a cylindrical shape and the diameters thereof in the locations of end portions in the axial direction and the central location differ from each other. As a result, a stepped cylindrical shape is formed. Thus, the smallest diameter is in the central location in the axial direction of the cylindrical main body portion, and the largest diameter is at the end portions in the axial direction. Two steps are present between the smallest-diameter portion in the central location in the axial direction of the cylindrical main body portion and the largest-diameter portions at the end portions in the axial direction. The largest-diameter portions at the end portions in the axial direction have a small length in the axial direction and a substantially collar-like shape is formed. The end portion of the cylindrical main body portion 41 in the axial direction is an axial end surface 43 formed as a flat surface that is perpendicular to the axial direction. A hole opening 42*a* of the axial through hole 42 is located in a central position in the diameter direction of the axial end surface 43. A tilted end surface is formed around the hole opening 42*a*. Further, as shown in FIG. 1C and FIG. 3B, a mounting groove 43*a* is formed in the axial end surface 43, and part of the main sliding unit 5 of the sliding shaft support member A is inserted into the mounting groove 43*a*. The mounting groove 43*a* is formed such that the size thereof in the width direction is substantially equal to or slightly larger than a size Ha in the up-down direction of a contact region portion 51 of the main sliding unit 5 of the sliding shaft support member A (see FIG. 3B).

As shown in FIGS. 1C and 1D and FIG. 6A, the sliding shaft support member A is constituted by the slide body portion 5 and buffer portions 6. The sliding shaft support member A is mounted on the collar member 4 and between the two movable side portions 21, 21 of the movable bracket 2 and serves as an accommodating structural member that performs the telescopic adjustment function.

The main sliding unit 5 is formed from a synthetic resin, and this synthetic resin is suitable for sliding. The resin surface is comparatively hard and inelastic. A polyacetal is used as a specific material. The material of the main sliding unit 5 preferably has sufficient resistance to sliding wear and a hard resin is overall preferred. The inelasticity of the main sliding unit 5, as referred to herein, does not mean that the main sliding unit has absolutely no elasticity. Thus, somewhat elastic materials may be also used. A rubber or a resin having elasticity is used for the buffer portions 6. It is especially preferred that the buffer portions 6 be from a material having elasticity sufficient to absorb impacts.

Figure 5B:
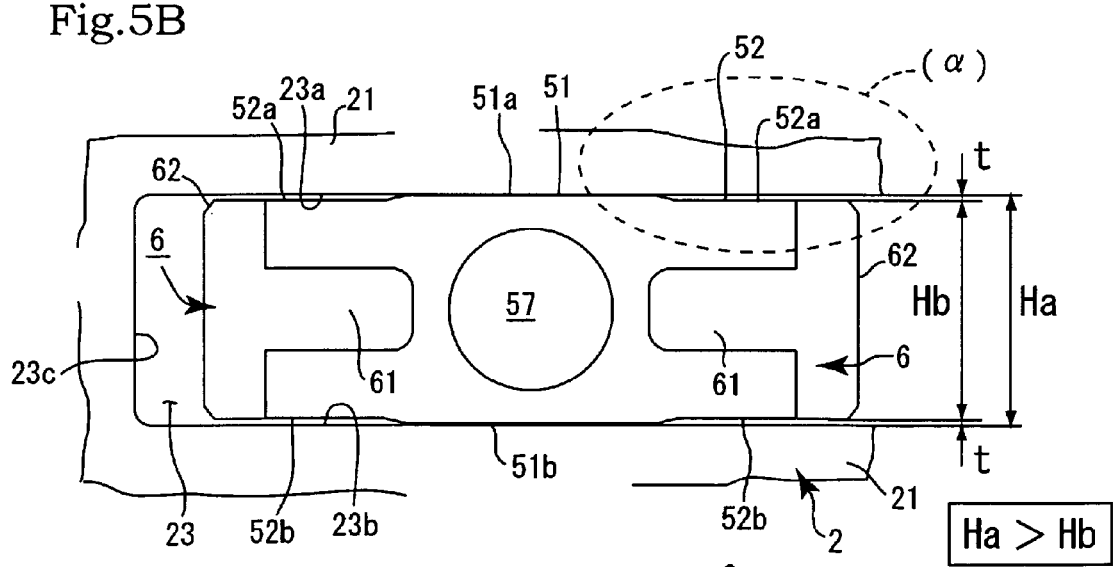
FIG. 5B is a principal enlarged view illustrating a state in which the sliding shaft support member is mounted on the long hole for telescopic adjustment.

As shown in FIGS. 6A, 6C, 6D, and 6E, in the main sliding unit 5, a substantially central zone in the front rear direction at both surfaces in the up-down direction serves as a contact region portion 51, and the upper and lower surfaces of the contact region portion 51 are constituted by an upper sliding surface 51*a* and a lower sliding surface 51*b*. As shown in FIG. 5B, the upper sliding surface 51*a* is in contact with the upper guide end edge 23*a* of the long hole 23 for telescopic adjustment, and the lower sliding surface 51*b* is in contact with the lower guide end edge 23*b* of the long hole 23 for telescopic adjustment. When the sliding shaft support member A slidably moves in the long hole 23 for telescopic adjustment, the upper sliding surface 51*a* and lower sliding surface 51*b* slide along the upper guide end edge 23*a* and lower guide end edge 23*b*.

The state in which the upper sliding surface 51*a* is in contact with the upper guide end edge 23*a* of the long hole 23 for telescopic adjustment and the lower sliding surface 51*b* is in contact with the lower guide end edge 23*b* of the long hole 23 for telescopic adjustment also includes an almost contact state. The almost contact state as referred to herein includes a state in which the upper sliding surface 51*a* is brought very close to the upper guide end edge 23*a*, and the lower sliding surface 51*b* is brought very close to the lower guide end edge 23*b*.

Thus, the sliding shaft support member A is disposed between the upper guide end edge 23*a* and lower guide end edge 23*b* of the long hole 23 for telescopic adjustment, and the sliding shaft support member A slides along the front-rear direction of the long hole 23 for telescopic adjustment. For this sliding operation to be smooth, mating of the sliding shaft support member A with the long hole 23 for telescopic adjustment can be of a clearance fitting structure, and in this case, upper sliding surface 51*a* and upper guide end edge 23*a*, or the lower sliding surface 51*b* and lower guide end edge 23*b* can be in a contactless state, but very close to each other between the sliding shaft support member A and long hole 23 for telescopic adjustment. Thus, the state of contact between the sliding shaft support member A and long hole 23 for telescopic adjustment also includes an almost contact state which is a state in which the two are brought very close to each other.

Figure 5C:
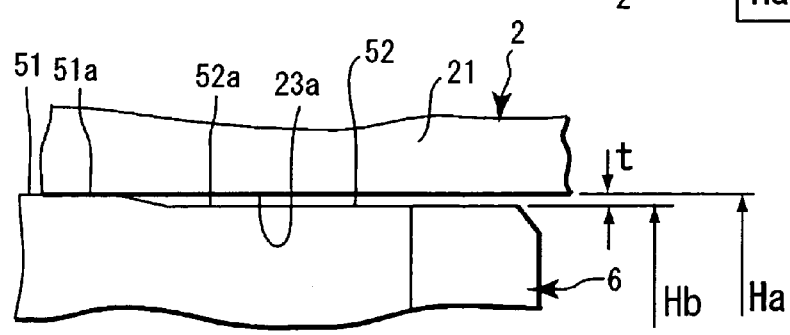
FIG. 5C is an enlarged view of (a) in FIG. 5B.

Contactless region portions 52 are present at both sides in the front-rear direction of the main sliding unit 5 (see FIGS. 5B and 5C and FIG. 6A). An upper end surface 52*a* and a lower end surface 52*b* of the contactless region portion 52 are regions that are not in contact with the upper guide end edge 23*a* and lower guide end edge 23*b* of the long hole 23 for telescopic adjustment. The size Ha of the contact region portion 51 in the up-down direction is larger than the size Hb of the contactless region portion 52 in the up-down direction, that is, Ha>Hb (see FIG. 5B and FIG. 6A).

A recess 53 that is configured to have a substantially bifurcated shape along the up-down direction and at both sides in the front rear direction of the main sliding unit 5 is formed in the main sliding unit in the vicinity of a substantially central portion in the up-down direction. The bifurcated zone constituted by the recess 53 is called a bifurcated portion 54 (see FIGS. 6A, 6D, 6E). More specifically, the bifurcated portion 54 is formed along part of the contact region portion 51 and the contactless region portion 52. Further, through holes 55, 55 that pass through in the up-down direction are formed in the bifurcated portion 54 in a position corresponding to the formation zone of the recess 53. A shaft portion 56 if formed integrally along the up-down direction in the bifurcated portion 54 and in the formation zone of the recess 53. The shaft portion 56 is formed to have a cross section of a substantially quadrangular shape such as a square shape and a rectangular shape.

A shaft support hole 57 is formed in the center of the main sliding unit 5 in the up-down direction and front-rear direction (see FIG. 6). The formation direction of the shaft support hole 57 is perpendicular to the front-rear direction and up-down direction of the main sliding unit 5. The shaft support hole 57 serves to support the bolt of the tightening tool. A cylindrical portion 58 is formed in the formation zone of the shaft support hole 57 to have the same radial center. The axial direction of the cylindrical portion 58 is also perpendicular to the front-rear direction and up-down direction of the main sliding unit 5. The through hole of the cylindrical portion 58 also coincides with the shaft support hole 57, and the shaft support hole 57 extends along the axial direction of the cylindrical portion 58. In this case, a state of mounting on the movable side portion 21 of the movable bracket 2 is taken as a reference for the front-rear direction of the sliding shaft support member A, and the sliding direction thereof is called the front-rear direction. Therefore, the front-rear direction of the main sliding unit 5 constituting the sliding shaft support member A is also identical to the front-rear direction of the sliding shaft support member A.

The buffer portions 6, 6 are fixedly attached to both sides of the main sliding unit 5 in the front-rear direction. As described above, the buffer portions 6 are formed from a rubber or an elastic resin material. An EPDM (rubber) is used as the specific material. A casting forming process is a forming means thereof.

In the sliding shaft support member A, part of the buffer portion 6 is inserted into the recess 53. The part of the buffer portion 6 inserted into the recess 53 is called an insertion piece 61. The buffer portion 6 has an abutment piece 62 formed in a substantially rectangular parallelepiped shape along the entire surface at both ends in the front-rear direction of the main sliding unit 5.

A locking protruding piece 63 of the buffer portion 6 is formed at both, upper and lower, surfaces of the abutment piece 62 inside the through holes 55, 55. The shaft portion 56 of the main sliding unit 5 is configured to pass through a part of the buffer portion 6, and the buffer portion 6 can be fixedly attached to obtain a joint structure in which the buffer portion is very strongly fixed to the main sliding unit 5.

By providing a formation cavity of a mold for the buffer portions 6 that corresponds to the upper end surface 52a and lower end surface 52b of the contactless region portion 52 when the buffer portion 6 is formed via the recess 53 of the main sliding unit 5, it is possible to obtain a configuration in which the buffer portions 6 are not in contact with the upper guide end edge 23a and lower guide end edge 23b of the long hole 23 for telescopic adjustment, similarly to the contactless region portion 52 of the main sliding unit 5 (see FIG. 4B and FIGS. 5B and 5C). As described hereinabove, where the recess 53 having a substantially bifurcated shape is formed in the sliding shaft support member A and part (insertion piece 61) of the buffer portion 6 is inserted and fixedly attached to the recess 53, the volume ratio of the buffer portions 6 in the sliding shaft support member A is increased.

Where the volume of the buffer portions 6 increases, when the sliding shaft support member A abuts against the front stop end edge 23c and rear stop end edge 23d of the long hole 23 for telescopic adjustment, the capacity of absorbing the impact of such an abutment also increases, as shown in FIG. 7, and the load at the time of impact (distributed load) can be dispersed inside the buffer portion 6 and can minimize the impact. FIG. 7 shows a process of absorbing the impact when the sliding shaft support member A abuts against the front stop end edge 23c and rear stop end edge 23d of the long hole 23 for telescopic adjustment.

Loads q, q, . . . that are distributed loads induced by impacts are applied at an instant the sliding shaft support member A abuts against the front stop end edge 23c or rear stop end edge 23d (in FIG. 7, the front stop end edge 23c) of the long hole 23 for telescopic adjustment, and the protrusion size K of the buffer portion 6 is reduced by $\Delta K$ and becomes Kp (see FIG. 7A). At the same time, counter forces r, r, . . . that are distributed loads from the front stop end edge 23c act upon the buffer portion 6, these counter forces r, r, . . . are diffused inside the buffer portion 6, and the impacts can be absorbed with even better efficiency.

Further, in the second embodiment of the sliding shaft support member A, the attachment structure of the buffer portion 6 to the main sliding unit 5 is obtained by forming only the contact region portion 51, contactless region portion 52, and recess 53 in the main sliding unit 5 and fixedly attaching the buffer portion 6 to the recess 53 (see FIG. 8A). In this case, only the buffer portions 6 are molded in the mold and the insertion piece 61 of the buffer portion 6 is inserted into the recess 53 of the main sliding unit 5.

Further, the main sliding unit 5 and buffer portion 6 can be also joined by a dovetail joint structure. Thus, in such a configuration, a mortise 59 is formed in the main sliding unit 5, a tenon 64 that will be locked in the mortise 59 is formed in the buffer portion 6, and the tenon 64 of the buffer portion 6 is locked in and joined with the mortise 59 of the main sliding unit 5 (see FIGS. 8A and 8B). In the third embodiment of the sliding shaft support member A, the upper sliding surface 51a and lower sliding surface 51b are provided over the entire upper and lower surfaces in the main sliding unit 5 and no contactless region portion 52 is formed in the main sliding unit 5 (see FIGS. 8C and 8D).

The configuration of the steering apparatus in accordance with the present invention will be explained below. The main sliding unit 5 and buffer portions 6 of the sliding shaft support member A are inserted into and mounted on the long hole 23 for telescopic adjustment. The upper sliding surface 51a and lower sliding surface 51b of the contact region portion 51 of the main sliding unit 5 are brought into sliding contact with the upper guide end edge 23a and lower guide end edge 23b of the long hole 23 for telescopic adjustment and inserted into the long hole 23 for telescopic adjustment. In this state, the sliding shaft support member A is set so that it can slide along the longitudinal direction of the long hole 23 for telescopic adjustment.

Figure 4C:
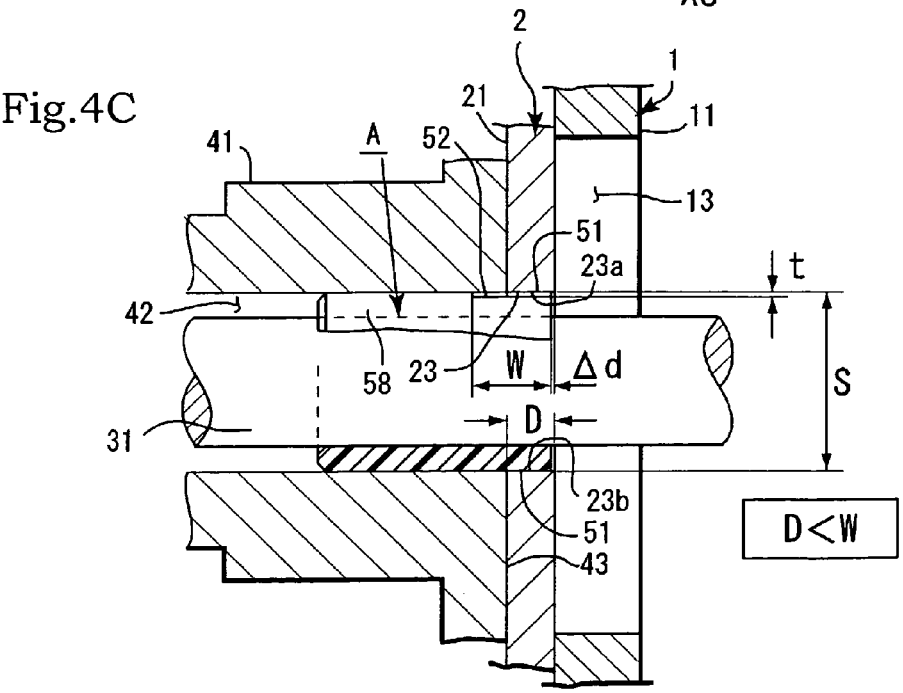
FIG. 4C is a principal sectional view along the Xc-Xc arrows in FIG. 4B.

The zone of sliding contact in the contact region portion 51 of the main sliding unit 5 with the long hole 23 for telescopic adjustment is in a state of abutment or almost abutment, and the dimensions of the two are preferably determined such that the sliding shaft support member A can smoothly slide with respect to the long hole 23 for telescopic adjustment in a stable state, without causing a play or vibrations. Thus, the size S of spacing (see FIG. 4C) of the upper guide end edge 23a and lower guide end edge 23b of the long hole 23 for telescopic adjustment is selected such as to be equal to or slightly larger than the size Ha of the contact region portion 51 of the long hole 23 for telescopic adjustment. Further, the spacing t of the contactless region portion 52 and upper guide end edge 23a and the spacing t of the contactless region portion 52 and lower guide end edge 23b in this case are shown in the figure.

Further, the contact region portion 51 of the main sliding unit 5 has a quadrangular such as rectangular shape, and the zones of contact of the long hole 23 for telescopic adjustment with the upper sliding surface 51a and lower sliding surface 51b are in surface contact. The thickness size W of the main sliding unit 5 and buffer portions 6 of the sliding shaft support member A is larger than a thickness size D of the long hole 23 for telescopic adjustment of the movable bracket 2. In this case, the main sliding unit 5 and buffer portions 6 have the same size in the thickness direction. Thus, the thickness size of the main sliding unit 5 is W and the thickness size of the buffer portions 6 is also W (see FIGS. 6B and 6E). More specifically, the thickness size W of the main sliding unit 5 and buffer portions 6 is larger than the depth size D of the long hole 23 for telescopic adjustment of the movable bracket 2, and the dimensional relationship thereof is D<W. Further, there may be a slight (very small) difference Δd in the thickness size.

In the assembling operation in accordance with the present invention, first, the collar member 4 is disposed between the two movable side portions 21, 21. Then, the cylindrical portion 58 of the sliding shaft support member A is inserted into a hole opening 42a of the axial through hole 42 of the collar member 4 so that the main sliding unit 5 and buffer portions 6 of the sliding shaft support member A are slidably inserted into the two long holes 23, 23 for telescopic adjustment of the movable bracket 2, then part of the main sliding unit 5 is inserted into the mounting groove 43a formed in the axial end portion 43, and the sliding shaft support member A is mounted on both axial ends of the collar member 4 (see FIG. 1C and FIG. 3).

The fixed side portion 11, 11 of the fixed bracket 1 are disposed so that the two movable side portions 21, 21 of the movable bracket 2 are interposed therebetween, the long holes 23, 23 for telescopic adjustment of the movable bracket 2 are aligned with the adjustment holes 13, 13 of the fixed bracket 1, and the bolt 31 of the tightening tool 3 is inserted into the adjustment holes 13, 13, long holes 23, 23 for telescopic adjustment, axial through hole 42, and sliding shaft support members A, A (see FIG. 2A, FIG. 4A, and FIG. 5A).

Then, the lock lever portion 33 and tightening cam 34 are mounted on the bolt 31, and the bolt 31 is mounted by the nut 32 on the fixed bracket 1 and movable bracket 2. The thickness of the tightening cam 34 is changed in the axial direction of the bolt 31 by the rotational operation of the lock lever portion 33. The rotational operation of the lock lever portion 33 also generates a tightening force in the entire tightening tool 3, the two fixed side portion 11, 11 of the fixed bracket 1 are pushed so as to come closer to each other, the two fixed side portions 11, 11 apply pressure to the two movable side portions 21, 21 of the movable bracket 2, and the movable bracket 2 is fixed to the fixed bracket 1, or the rotational operation of the lock lever portion 33 can release the tightening, thereby enabling the tilting and telescopic adjustment (see FIG. 1A).

In accordance with the present invention, the buffer portions 6, 6 are fixedly attached to both sides (in the front-rear direction) of the main sliding unit 5 of the sliding shaft support member A, the upper and lower surfaces of the slide body portion 5 are brought in a state of slidable contact with the upper guide end edge 23a and lower guide end edge 23b of the long hole 23 for telescopic adjustment, and the buffer portions 6 can be abutted against only the front stop end edge 23c and rear stop end edge 23d. In other words, it is the main sliding unit 5 that slides with respect to the long hole 23 for telescopic adjustment, and impact absorption by abutment against the front stop end edge 23c and rear stop end edge 23d of the long hole 23 for telescopic adjustment is performed by the two buffer portions 6, 6.

Further, the buffer portions 6 do not come into contact with the upper guide end edge 23a and lower guide end edge 23b of the long hole 23 for telescopic adjustment. Therefore, an elastic material that can be extremely easily deformed and has high impact absorption ability can be selected for the buffer portions 6. Further, such a material constituting the buffer portions 6 comes into intimate contact with other components and cannot be prevented from being easily caught thereby. Accordingly, such a material is unsuitable for sliding operation, but the present invention still makes it possible to use such a material.

What is claimed is:

1. A steering apparatus, comprising:
a fixed bracket;
a movable bracket comprising a movable side portion in which holes for telescopic adjustment are formed at both sides in a width direction;
a sliding shaft support member that comprises a shaft support hole formed therein and can slide inside the holes for telescopic adjustment; and
a tightening tool that links the fixed bracket and the movable bracket and is supported by the sliding shaft support member,
wherein the holes for telescopic adjustment have both end edges in an up-down direction as guide edges and have both ends in a front-rear direction as stop end edges,
wherein the sliding shaft support member comprises a main sliding unit comprising an inelastic resin and buffer portions comprising one of a rubber and a resin,
wherein recesses are formed at both sides in the front-rear direction and close to a center in the up-down direction in the main sliding unit,
wherein the buffer portions comprise abutment pieces formed along an entire surface at both ends in the front-rear direction of the main sliding unit and insertion pieces to be inserted into the recesses,
wherein upper and lower surfaces of the main sliding unit are in a state of sliding contact with the guide edges of the hole for telescopic adjustment, and
wherein the buffer portions can abut only on the two stop end edges and do not come into contact with the two guide edges.

2. The steering apparatus according to claim 1, wherein the upper and lower surfaces in a substantially central portion in the front-rear direction of the main sliding unit of the sliding shaft support member comprise contact region portions comprising sliding surfaces that are in contact with upper and lower guide edges of the hole for telescopic adjustment, and wherein said two sides in the front-rear direction of the main sliding unit comprise contactless region portions that are not in contact with the two guide edges.

3. The steering apparatus according to claim 2, wherein substantially bifurcated portions are formed along the up-down direction and the recesses are formed substantially close to the center in the up-down direction of the bifurcated portions at both sides in the front-rear direction of the main sliding unit of the sliding shaft support portion, wherein through holes that pass through in the up-down direction are formed in the main sliding unit in a position corresponding to a zone where the bifurcated portions are formed, wherein shaft portions are integrally formed in the up-down direction of the recesses, wherein protrusions are formed along the through holes in the buffer portions, and wherein the protrusions of the buffer portions are fixedly attached to the through holes in a state of being inserted therein.

4. The steering apparatus according to claim 1, wherein substantially bifurcated portions are formed along the up-down direction and the recesses are formed substantially close to the center in the up-down direction of the bifurcated portions at both sides in the front-rear direction of the main sliding unit of the sliding shaft support portion, wherein through holes that pass through in the up-down direction are formed in the main sliding unit in a position corresponding to zones where the bifurcation portions are formed, wherein shaft portions are integrally formed in the up-down direction of the recesses, wherein protrusions are formed along the through holes in the buffer portions, and wherein the protrusions are fixedly attached to the through holes in a state of being inserted therein.

5. The steering apparatus according to claim 1, wherein the abutment pieces are formed in a substantially rectangular parallelepiped shape along a substantially the entire surface at said both ends in the front-rear direction of the main sliding unit.

* * * * *